US008031622B2

(12) United States Patent
Padovani et al.

(10) Patent No.: US 8,031,622 B2
(45) **Date of Patent: *Oct. 4, 2011**

(54) METHOD AND APPARATUS FOR RECEIVE DIVERSITY IN A COMMUNICATION SYSTEM

(75) Inventors: Roberto Padovani, San Diego, CA (US); Parag A. Agashe, San Diego, CA (US); S. Hossain Beladi, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1572 days.

This patent is subject to a terminal disclaimer.

(21) Appl. No.: 10/079,956

(22) Filed: Feb. 19, 2002

(65) Prior Publication Data

US 2003/0156561 A1 Aug. 21, 2003

(51) Int. Cl.
*G01R 31/08* (2006.01)

(52) U.S. Cl. ........ 370/252; 370/342; 370/335; 375/267; 375/347

(58) Field of Classification Search .................. 375/267, 375/347
See application file for complete search history.

(56) References Cited

U.S. PATENT DOCUMENTS 5,203,023 A 4/1993 Saito et al.
5,267,261 A 11/1993 Blakeney, II et al.
5,625,880 A 4/1997 Goldburg et al.
5,826,172 A 10/1998 Ito et al.
5,940,452 A * 8/1999 Rich ............................. 375/347
5,991,282 A 11/1999 Langlet et al.
6,023,615 A * 2/2000 Bruckert et al. ........... 348/14.08
6,111,865 A 8/2000 Butler et al.
6,138,034 A * 10/2000 Willey .......................... 455/522
6,141,536 A 10/2000 Cvetkovic et al.
6,505,058 B1 1/2003 Willey
6,505,508 B1 * 1/2003 Kameyama et al. ............ 73/147
6,615,386 B2 * 9/2003 Yano et al. .................... 714/780
(Continued)

FOREIGN PATENT DOCUMENTS

EP 1001557 A2 5/2000
JP 11150497 6/1999
JP 2000165272 6/2000
WO WO98005129 2/1998
WO WO0105088 A1 1/2001
WO WO0163808 A1 8/2001
WO WO01059945 8/2001

OTHER PUBLICATIONS

Sarkar S et al: "The paging channel in cdma2000" IEEE Conference Proceedings, Sep. 28, 1999, pp. 257-264, XP010354967.

*Primary Examiner* — Duc C Ho
(74) *Attorney, Agent, or Firm* — S. Hossain Beladi; William M. Hooks

(57) ABSTRACT

In a communication system (100) for decoding a quick paging channel (QPCH), a receiver (200) determines a channel condition of a pilot channel received at a mobile station (102-104). A control system (210, 401) determines receive diversity at the receiver (200) by determining a number of a plurality of receiver chains (290) in the receiver (200) for receive diversity based on the determined channel condition. The receiver (200) determines a first data bit of the QPCH in accordance with processing of one or more signals produced based on the determined receive diversity. The control system (210, 401) is configured for reducing the number of selected receiver chains (290) when the determined channel condition is above a first channel condition threshold (601) and increasing the number of selected receiver chains (290) when the determined channel condition is below a second channel condition threshold (602).

34 Claims, 10 Drawing Sheets

U.S. PATENT DOCUMENTS 6,678,508 B1 1/2004 Koilpillai et al.
6,721,564 B1 * 4/2004 Kobayashi .................... 455/436
6,724,828 B1 4/2004 Dabak
7,006,468 B1 2/2006 Chen et al.
7,024,168 B1 * 4/2006 Gustafsson et al. .......... 455/135
2001/0043578 A1 11/2001 Kumar et al.
2002/0009156 A1 * 1/2002 Hottinen et al. .............. 375/267
2003/0063579 A1 * 4/2003 Lee .............................. 370/312
2003/0232629 A1 12/2003 Jang et al.
2004/0090931 A1 * 5/2004 Proctor et al. ................ 370/328

* cited by examiner

METHOD AND APPARATUS FOR RECEIVE DIVERSITY IN A COMMUNICATION SYSTEM

FIELD

The present invention relates generally to the field of communications, and more specifically, to communications using a receive diversity technique.

BACKGROUND

The communication channel between a transmitter and a receiver may be time varying and dispersive. The dispersion of the channel may result in multipath propagation of transmitted signal; thus, at a receiving destination, more than one receiver chain may be needed to process the multipath received signals. A receiver chain for signals received at each antenna may be necessary. Therefore, multiple receiver chains may be necessary to exploit the multipath signals received at multiple receive antennas. Use of multiple receiver chains increases the power consumption. A mobile station in a communication system may greatly benefit from receive diversity; however, mobile stations generally have limited battery power supply.

Performance of mobile stations, in at least one aspect, is measured with respect to the length of time operating without recharging the battery power supply. Various schemes have been used and deployed in various communication systems to improve the battery life of a mobile station without limiting its operational functionalities. For example, in a communication system, a mobile station may periodically shut off and wake up in predefined assigned time periods to monitor a quick paging channel (QPCH). If the QPCH indicates possibility of a message for the mobile station, the mobile station directs its resources to monitor an assigned paging channel, a broadcast common channel or a common control channel. The directed channel may carry a detailed message directing the mobile station to process other channels. The QPCH carries indications of a page directed to the mobile station. The transmission of QPCH may be at a predefined power level to reach as many mobile stations in the coverage area of the transmitter. The QPCH, and other similar channels, therefore, may be transmitted without exploiting a power control scheme. The data in the QPCH may be hashed for two groups of mobile stations for receiving paging indications at different times. The mobile stations in the first group wake up during one time period to receive a QPCH and the second group at another time period. As a result, the mobile stations may conserve battery power while maintaining full functionalities.

The QPCH contains a single bit message to direct the mobile stations. If a mobile station detects a "zero", for example, indicating no message during its assigned time period, the mobile station may go back to sleep until the next assigned time period. If the mobile station detects a "one", for example, indicating a page, the mobile station assigns its resources to monitor other related channels. Receive diversity is beneficial for decoding the paging indication bit in the QPCH.

To benefit from the receive diversity, the receiver may have to turn on multiple receiver chains to process multiple received signals. As a result, the receiver may consume a substantial amount of battery power with respect to the amount of data that it is attempting to decode in the QPCH. Therefore, use of receive diversity for decoding QPCH may adversely effect the battery life of the mobile station. Without use of the receive diversity, the mobile station may erroneously decode the QPCH data resulting in inefficient use of the battery power resources.

To this end as well as others, there is a need for an effective use of receiver diversity for decoding various channels in a communication system.

SUMMARY

In a communication system for decoding a quick paging channel (QPCH), a receiver determines a channel condition of a pilot channel received at a mobile station. A control system determines receive diversity at a receiver of the mobile station by determining a number of a plurality of receiver chains in the receiver for receive diversity based on the determined channel condition. The receiver determines a first data bit of the QPCH received at the mobile station in accordance with processing of one or more signals produced based on the determined receive diversity. The control system is configured for reducing the number of selected receiver chains when the determined channel condition is above a first channel condition threshold and increasing the number of selected receiver chains when the determined channel condition is below a second channel condition threshold. The first channel condition threshold corresponds to a stronger channel condition than a channel condition corresponding to the second channel condition threshold. The control system is configured for adjusting a delta threshold corresponding to a difference between the first and second channel condition thresholds based on a mobility level of the receiver in the communication system. The control system is configured for increasing the delta threshold in response to an increasing mobility level and reducing the delta threshold in response to a decreasing mobility level.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, various aspects of the invention provide for efficient use of communication resources in a CDMA communication system. In accordance with at least one aspect of the invention, various conditions for using receive diversity are determined, including the conditions for decoding the quick paging channel (QPCH) and other similar channels. The QPCH and other similar channels may be transmitted at a fixed power level, with or without power control. The use of receive diversity is determined, most likely, for conditions that produces its beneficial features while improving battery power consumption and preventing erroneous decoding of the received data, in particular QPCH data and other fixed power level channels.

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
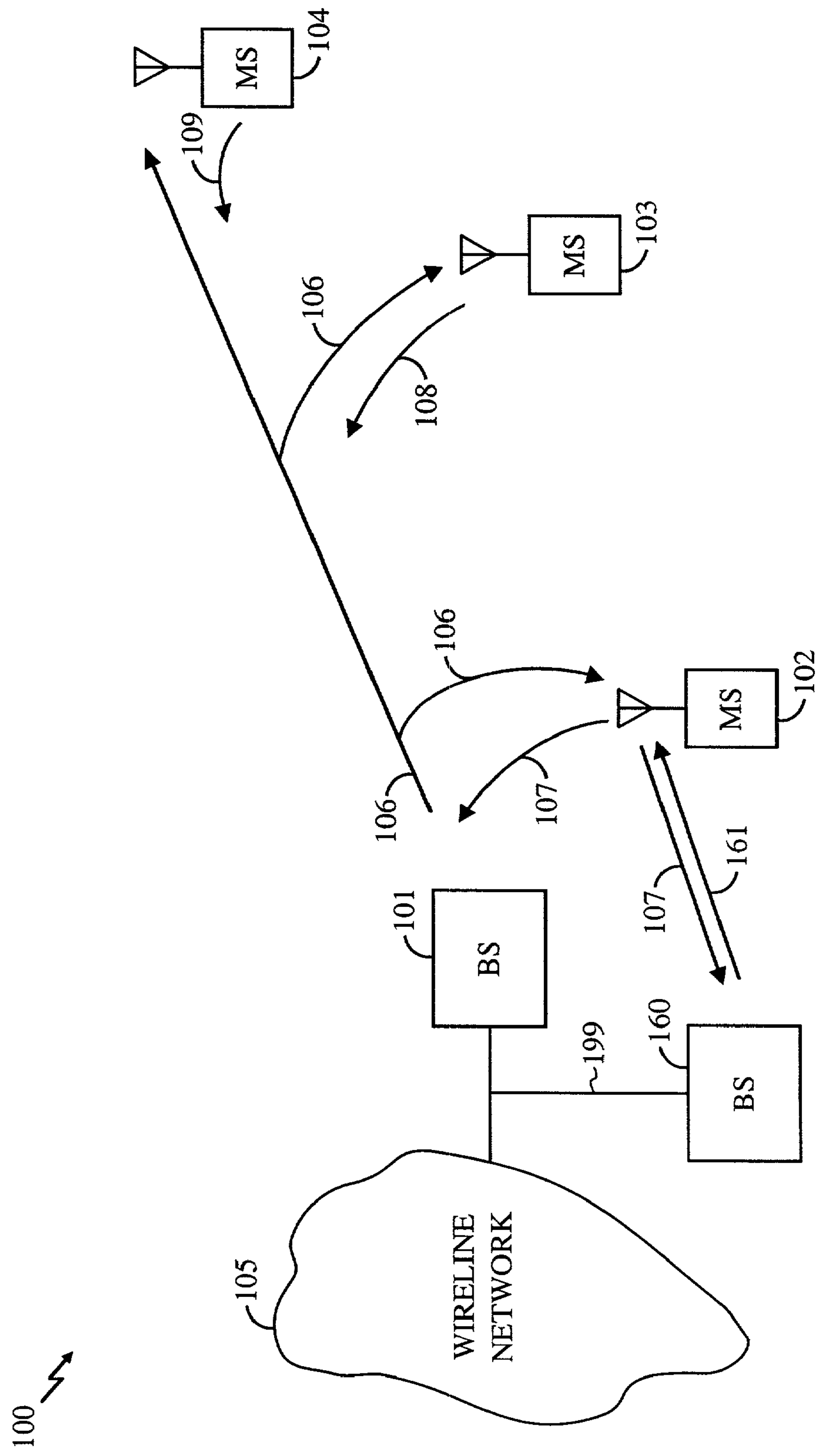
FIG. 1 depicts a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102.

The communication system 100 may also employ use of pilot channels for proper decoding of various channels. A pilot channel contains a series of predefined data. A receiver receives the pilot channel to determine various characteristics of the propagation channel. One of the characteristics may be a carrier to interference ratio (Ec/Io) of the pilot channel. The pilot channel may be used to decode other received channels. The forward and reverse links may have pilot channels. On the forward link, a base station may transmit a pilot channel for all the mobile stations in its coverage area. On the reverse link, each mobile station may combine the reverse link channels with a pilot channel.

Figure 2:
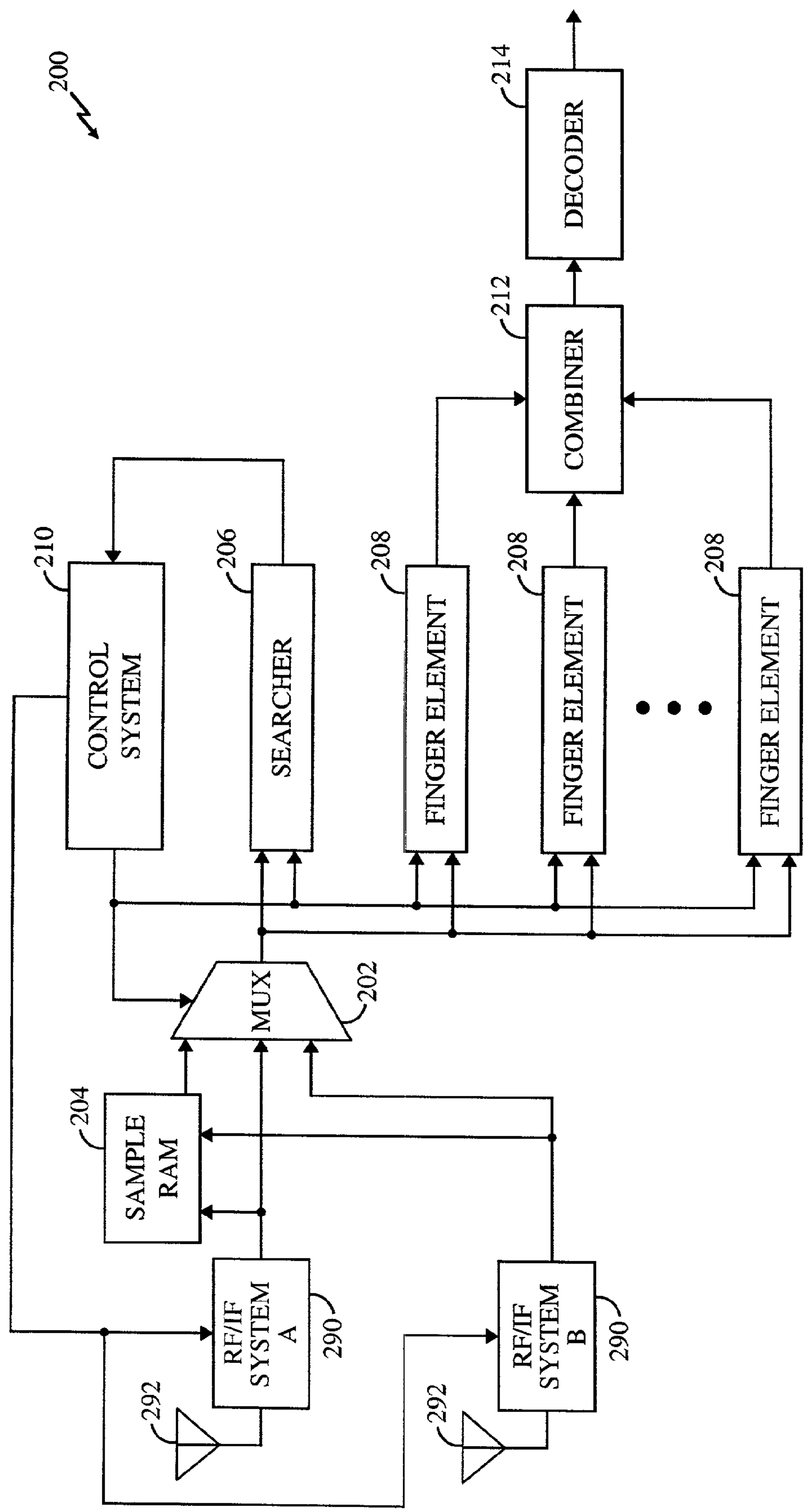
FIG. 2 depicts a communication system receiver for receiving and decoding received data at a data rate in accordance with various aspects of the invention.

FIG. 2 illustrates a block diagram of a receiver 200 used for processing and demodulating the received CDMA signal in accordance with various aspects of the invention. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. For example, RF/IF system 290 may include the RF/IF systems 290A and 290B, each being considered a receiver chain. More than two receiver chains may also be used. Each element of antenna system 292 receives an RF signal, and passes the received RF signal to a receiver chain in the RF/IF system 290. RF/IF system 290 may be any conventional RF/IF receiver. The RF/IF system 290 may be a "zero" intermediate frequency (ZIF) receiver. The received RF signals are filtered, down-converted and digitized to form RX samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to demux 202. Demux 202 supplies the samples to searcher unit 206 and finger elements 208. Control unit 210 configures finger elements 208 to perform demodulation and despreading of the received signal at different time offsets based on search results from searcher unit 206. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. The searcher 206 may decode the pilot channel to determine the channel condition, such as determining Ec/Io. If the Ec/Io of the pilot channel of the transmitting source is above a threshold, the control system 210 may decide to assign finger elements 208 to process other received channels from the same source. In the mobile station, various lists of base stations with adequate pilot channel Ec/Io are kept. The lists may include an active list of base stations, a candidate list of base stations, a neighboring list of base stations and a remaining list of base stations. The lists of the base stations may be organized in accordance with the received Ec/Io level. The base stations in the active list have the strongest received Ec/Io.

In accordance with various aspects of the invention, control system 210 controls the number of receiver chains used for processing the received channels based on the received pilot channel condition. Control system 210 controls the number of receiver chains used in the RF/IF system 290 based on the received pilot channel condition. The pilot channel condition may be based on the Ec/Io of the pilot channel. If the Ec/Io of the received pilot channel is strong, control system 210 reduces the number of receiver chains used in RF/IF system 290 for processing the multiple received signals. If the Ec/Io of the received pilot channel is weak, control system 210 increases the number of receiver chains in RF/IF system 290 for processing the multiple received signals. Therefore, receiver 200 operates its receive diversity based on the channel condition of a received pilot channel. The scale of the receive diversity, relating to the number of receiver chains, is based on the channel condition of the pilot channel.

For receive diversity, multiple received signals may be combined in accordance with any of the commonly known combining processes, such as maximal-ratio combining (MRC) and minimum mean-squared error (MMSE). Temporal combining, spatial combining, or a combination of both, may be used for the combining process. In temporal combining, the signals received through different propagation paths are combined. In the spatial combining, the signals received at different antennas and propagated through the same path are combined. In receiver 200, the results of the demodulation are combined in accordance with the receive diversity process, and passed the combined result to decoder 214. Decoder 214 decodes the data and outputs the decoded data. Receiver 200 may be used in a receiver portion of base stations 101 and 160 for processing the received reverse link signals from the mobile stations, and in a receiver portion of any of the mobile stations for processing the received forward link signals.

Figure 3:
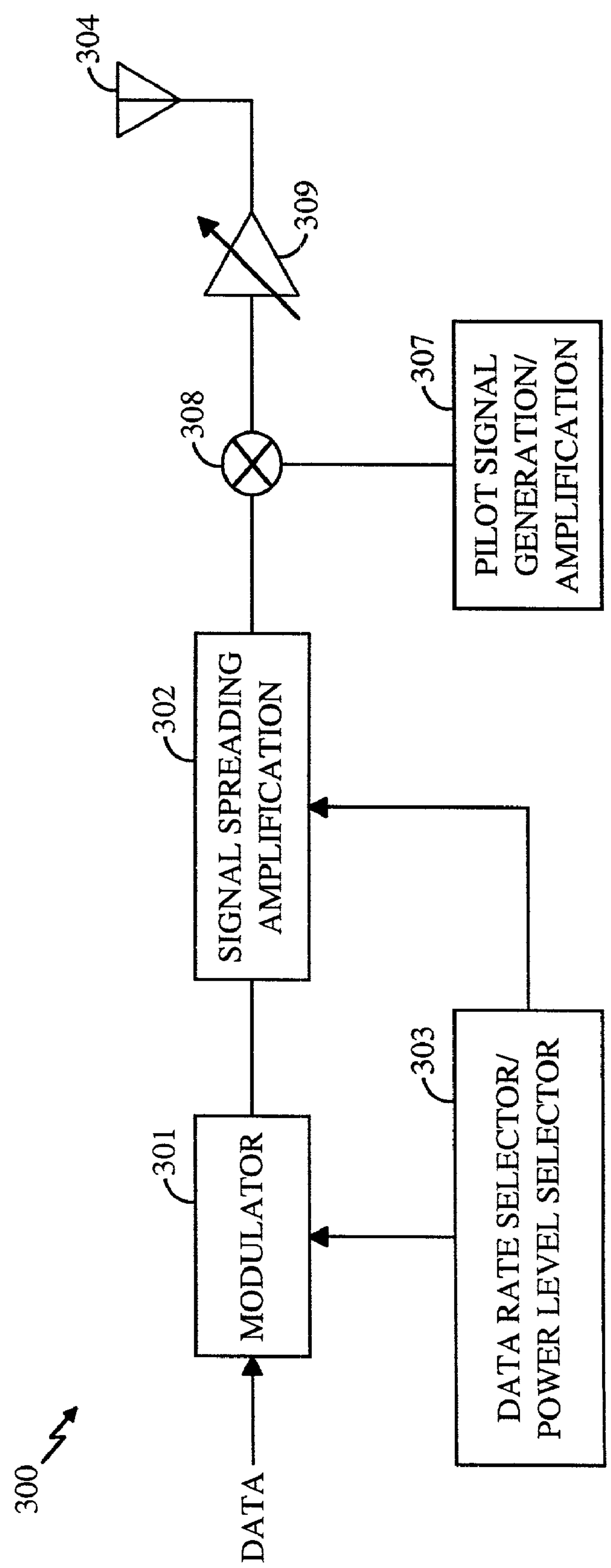
FIG. 3 depicts a communication system transmitter for transmitting data packets at a scheduled data rate in accordance with various aspects of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
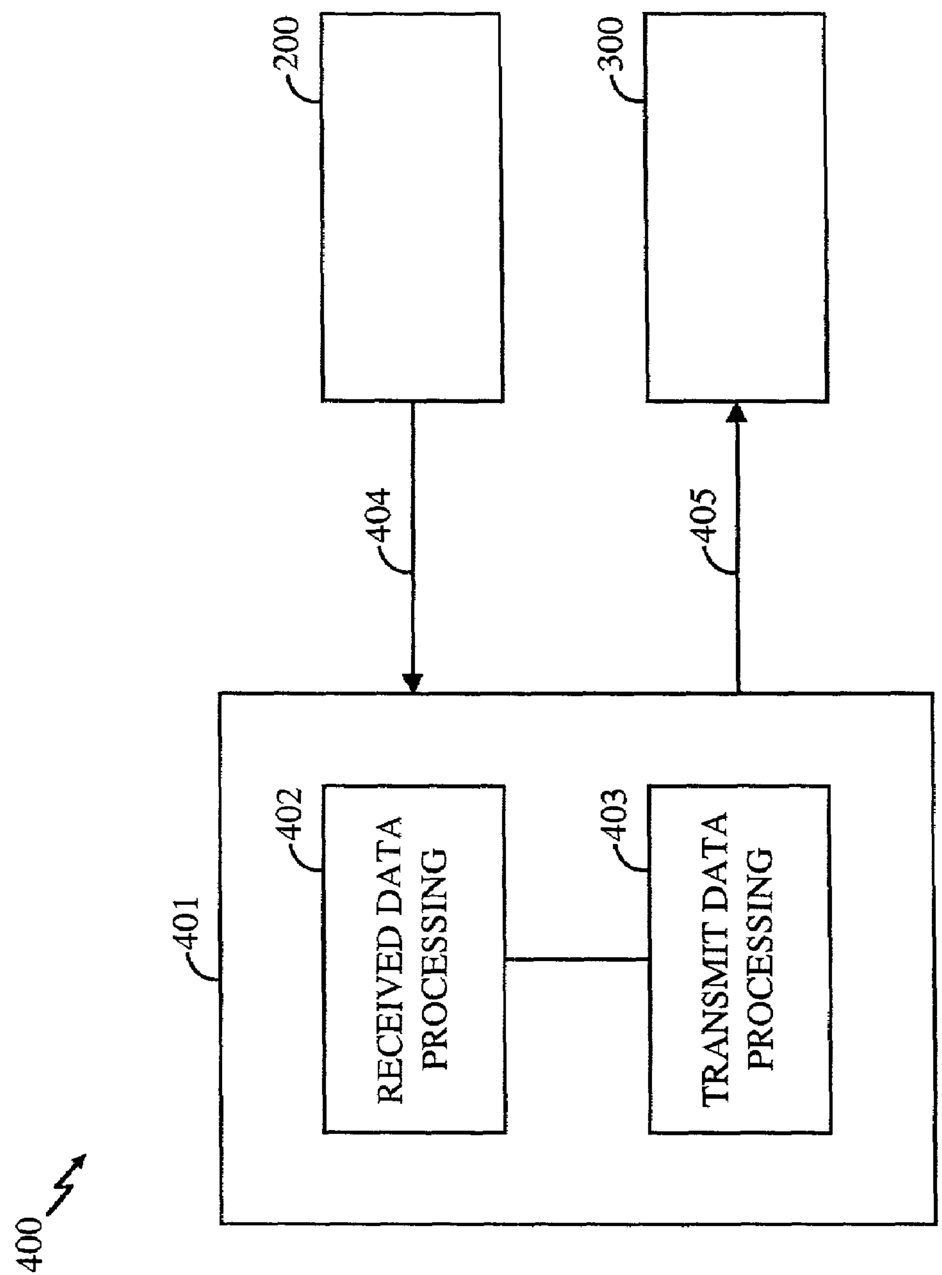
FIG. 4 depicts a transceiver system capable of operating in accordance with various embodiments of the invention.

FIG. 4 depicts a general block diagram of a transceiver system 400 for incorporating receiver 200 and transmitter 300 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting.

On the transmitting side, transmit data processing block 403 prepares the data for transmission on a transmit channel. Transmitter 300 receives the data for transmission on input 405, and transmits the data from an antenna system. On the receiving side, after the received data are decoded, the decoded data are received at processor 401 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or may operate similar to a computer. The device may be connected to a data network, such as Internet. In case of incorporating the transceiver 400 in a base station, the base station through several connections may be connected to a network, such as Internet.

Figure 5:
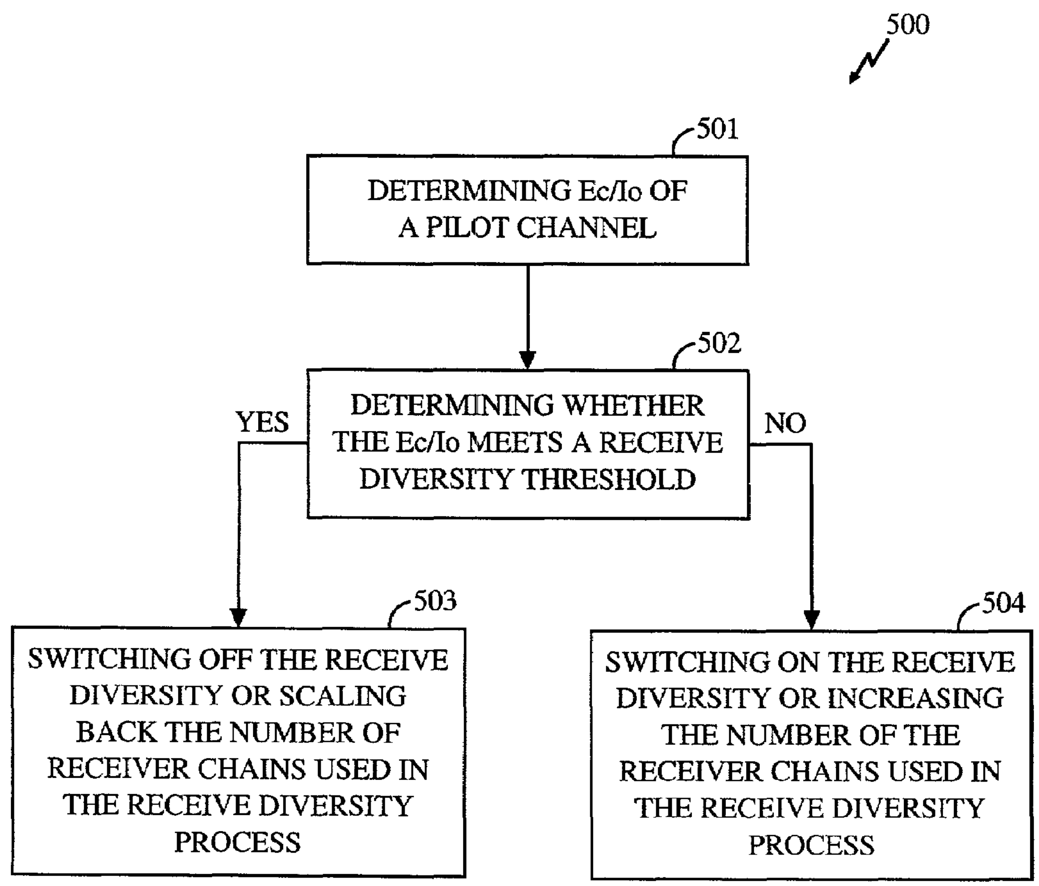
FIG. 5 illustrates a flow chart for determining scale of receive diversity based on a pilot channel condition in accordance with various embodiments of the invention.

FIG. 5 depicts a flow chart 500 for implementing one or more aspects of the invention. Various steps in flow chart 500 may be implemented by control system 210 or processor 401 or a combination of both. At step 501, the Ec/Io of a pilot channel is determined. The pilot channel may be from a base station in the active list of the mobile station. At step 502, the determined Ec/Io is compared to a receive diversity threshold. If the determined Ec/Io meets the receive diversity threshold, at step 503, the receive diversity may be turned off or scaled back. When the Ec/Io meets the receive diversity threshold, the channel condition is most likely very favorable, and thus there is no need for receive diversity or a large scale receive diversity. The number of receiver chains in receiver 200 may be more than two, for example four receiver chains may be incorporated. In such a case, when scaling back the receiver diversity, the number of receiver chains used in the receive diversity may be reduced from four to three or two or from three to two. When the receive diversity is turned off, only one receiver chain may be used. If the determined Ec/Io does not meet the receive diversity threshold, at step 504, the receive diversity may be turned on or increased in scale. When the Ec/Io does not meet the receive diversity threshold, the channel condition is most likely not very good, thus producing a favorable condition for using or increasing the scale of receive diversity. In such a case, when increasing the scale of the receiver diversity, the number of receiver chains used in the receive diversity may be increased to three or four. When the receive diversity is turned on, at least two receiver chains may be used.

Figure 6:
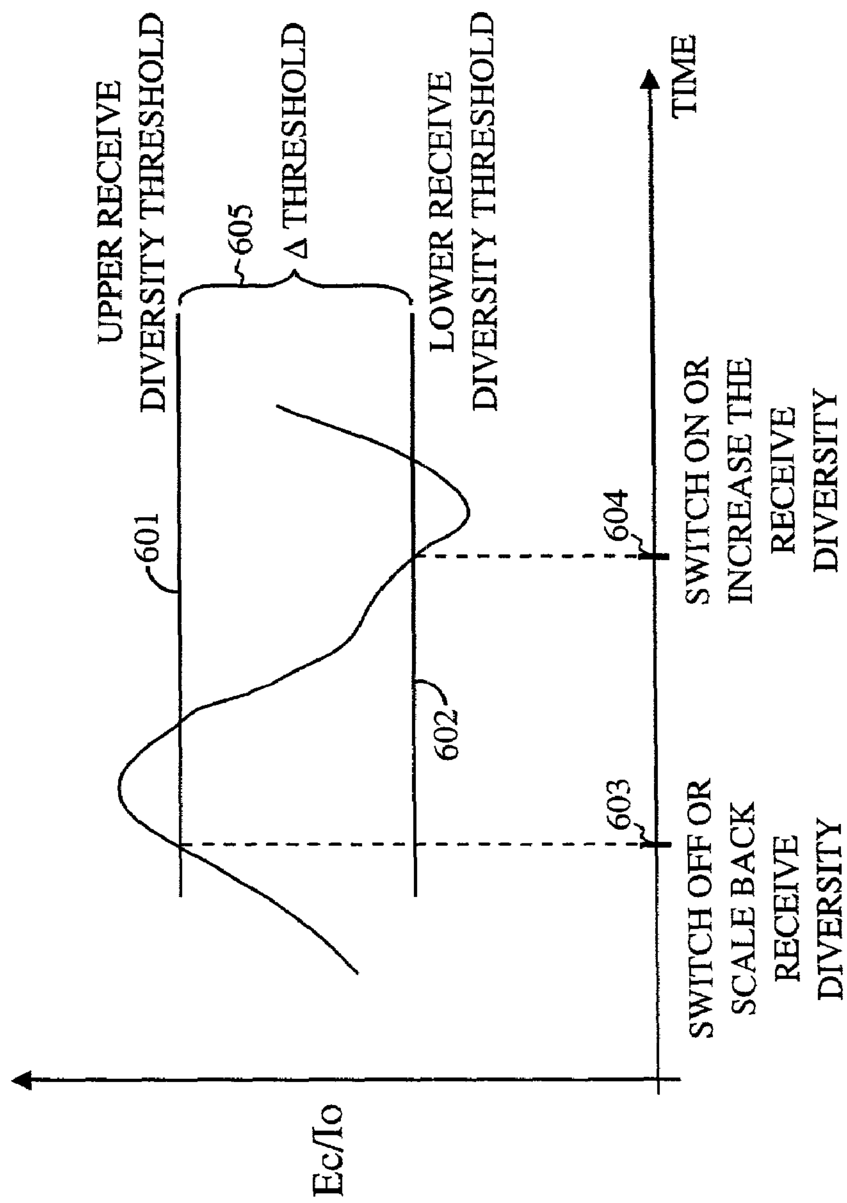
FIG. 6 illustrates various thresholds used for determining receive diversity in accordance with various embodiments of the invention.

FIG. 6 illustrates one or more processes for determining whether Ec/Io of the pilot channel meets the receive diversity threshold in accordance with various aspects of the invention. The determined Ec/Io is compared to an upper receive diversity threshold 601 and a lower receive diversity threshold 602. The upper threshold 601 is larger than the lower threshold 602. The difference between the upper and lower thresholds 601 and 602 is a delta threshold 605. At a time 603, when the Ec/Io moves above the upper threshold 601, the Ec/Io meets the receive diversity threshold of step 502. At time 604, when the Ec/Io moves below the lower threshold 602, the Ec/Io does not meet the receive diversity threshold of step 502.

The channel condition may change at all times. The Ec/Io may move above or below the thresholds 601 and 602 depending on the channel condition. The channel condition in a fast moving environment may change far more rapidly than a low moving channel condition. For example, if the mobile station is in a car traveling on a highway, the channel condition may be changing more rapidly than a mobile station on a pedestrian. In accordance with various aspects of the invention, the delta threshold 605 may change based on how fast the channel condition is changing. In a fast channel condition, corresponding to a condition that Ec/Io changes very rapidly, the delta threshold 605 may be increased to prevent excessive number of changes in the receive diversity. In a slow channel condition, corresponding to a condition that Ec/Io changes very slowly, the delta threshold 605 may be decreased to allow a change in the receive diversity.

Figure 7:
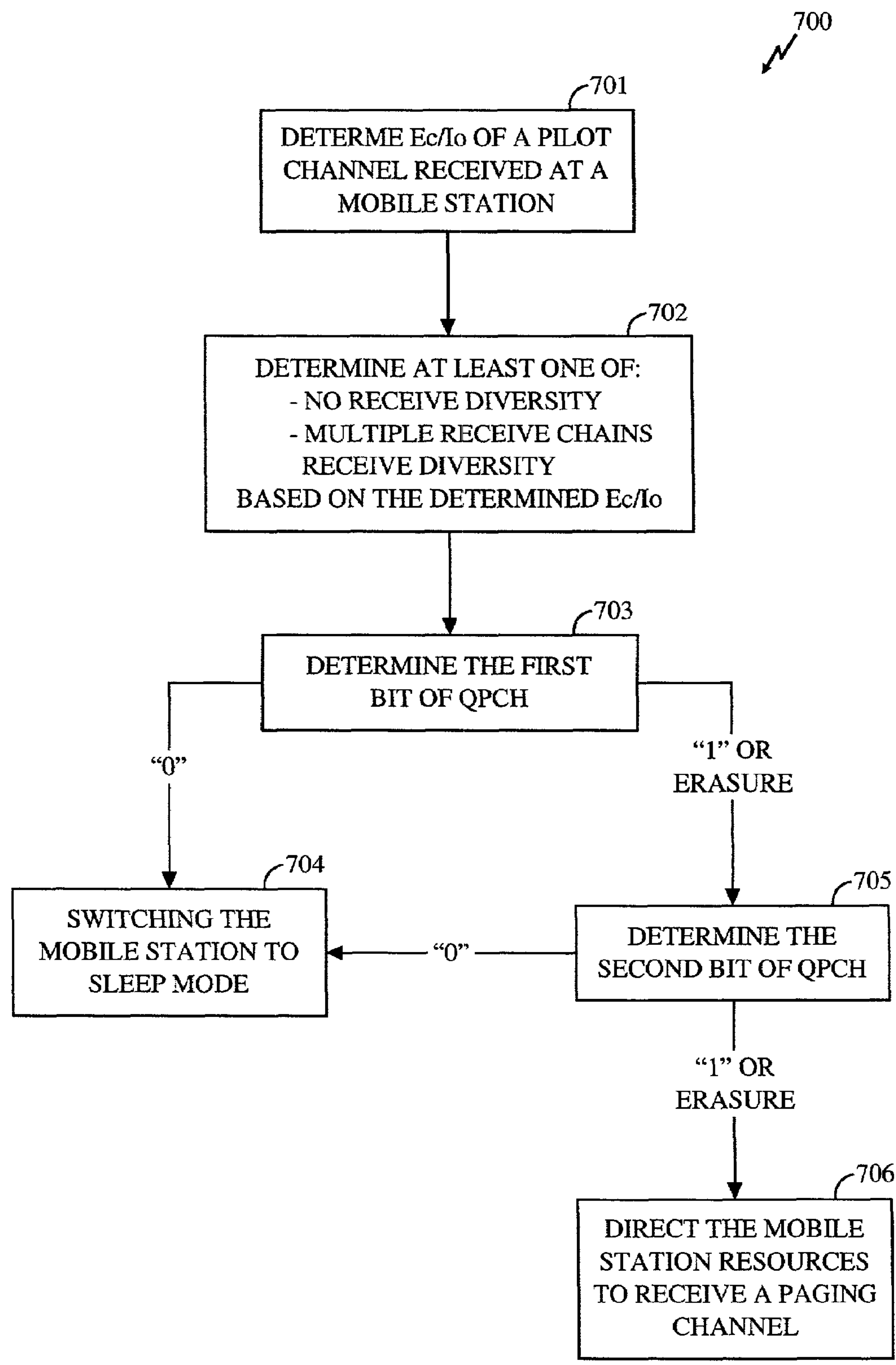
FIG. 7 illustrates a flow chart for determining data bits of QPCH and the steps for determining receive diversity based on a pilot channel condition in accordance with various embodiments of the invention.

Referring to FIG. 7, a flow chart 700 depicts various steps for processing QPCH in accordance with various aspects of the invention. At step 701, the Ec/Io of a pilot channel received at a mobile station is determined. The pilot channel may be originated from the same source that originated the QPCH. At step 702, the mobile station determines whether receive diversity is necessary based on the determined pilot channel Ec/Io. The controller 210 or processor 401 or both may be used to decide whether to use no diversity or multiple receiver chains receive diversity. Various steps described in relation to flow chart 500 and an illustration of diagram 600 may be used for implementing step 702.

The message on the QPCH is a single bit message, and transmitted twice per each transmitted time slot. Therefore, the QPCH carries a single bit message, the first and second bits are repetitions of the same single bit message. One ordinary skilled in the art may appreciate that the first bit may be referred to as the first transmission of QPCH bit and the second bit as the second transmission of the QPCH bit. After determining the scale of the receive diversity at step 702, whether to use one or multiple receiver chains and to what scale, the first bit of the QPCH is determined at step 703. if the first bit is a "zero", the controller 210 or processor 401 may switch the mobile station to a sleep mode at step 704. if the first bit is a "one" or an erasure, the second bit of the QPCH is determined at step 705. An erasure may be determined when the received signal energy is not high enough to determine with confidence whether a "one" or a "zero" was transmitted. if the second bit is a "zero", the mobile station is switched to a sleep mode at step 704. if the second bit is a "one" or an erasure, the mobile station directs its resources to receive an associated paging channel at step 706. Various steps of processing a QPCH are improved by determining the need for diversity before processing the data bits in QPCH. if the channel condition indicated by the Echo is poor, receive diversity is used, which in turn, improves the probability of decoding the first and second bits more accurately.

Figure 8:
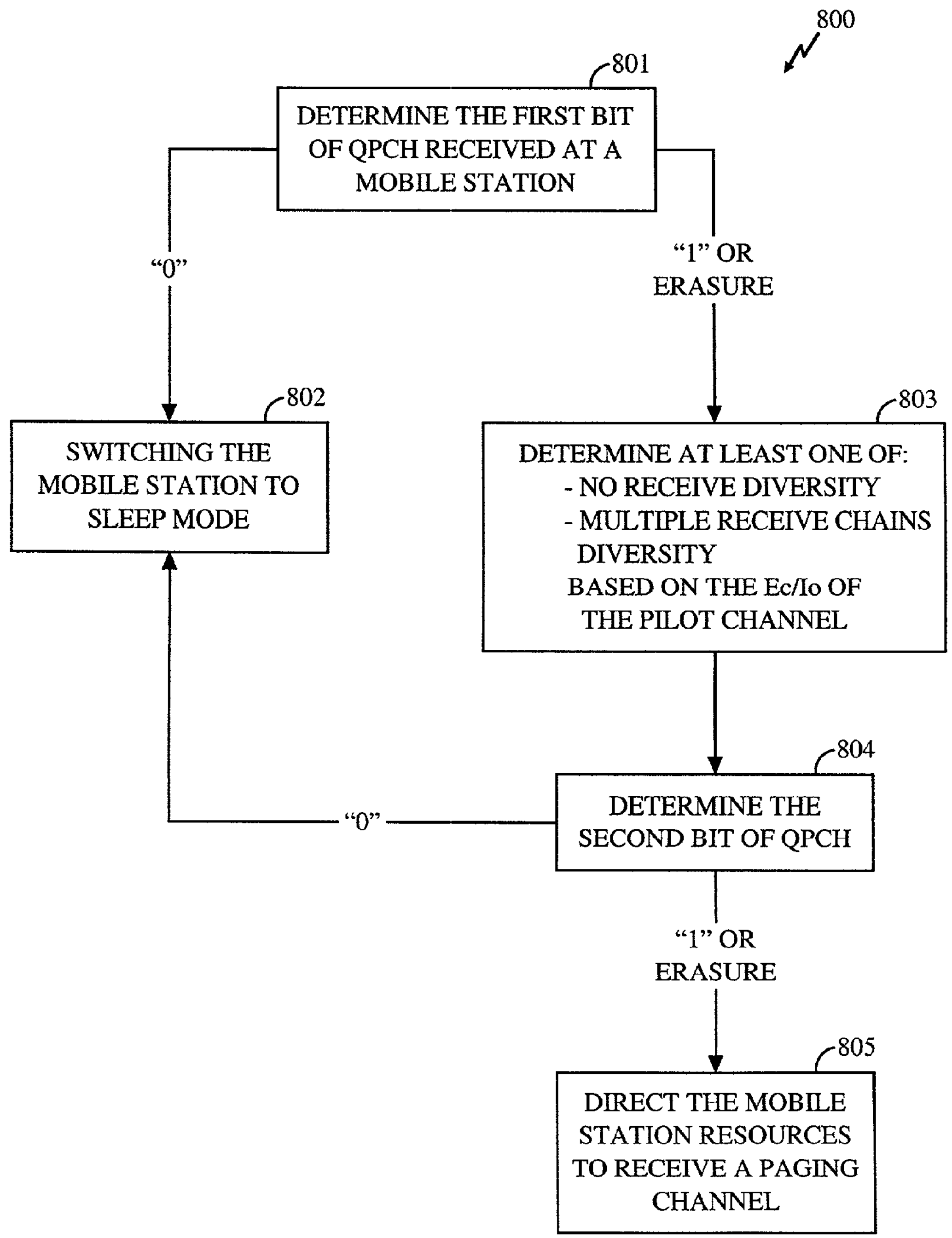
FIG. 8 illustrates a flow chart for determining data bits of QPCH and the steps for determining receive diversity based on a pilot channel condition in accordance with various embodiments of the invention.

Various steps for processing the QPCH is, further, improved by implementing various steps of flow chart 800 depicted in FIG. 8. At step 801, the first bit of the QPCH is determined. If a "zero" is detected, the mobile station is switched to a sleep mode at step 802. If a "one" or an erasure is detected, at step 803, the mobile station determines whether receive diversity is necessary based on a determined pilot channel Ec/Io. The controller 210 or processor 401 or both may be used to decide whether to use no diversity or multiple receiver chains receive diversity. Various steps described in relation to flow charts 500 and 600 may be used for implementing step 803. At step 804, the second bit of QPCH is determined. The process of determining the second bit at step 804 may include use of receive diversity. Therefore, depending on the channel condition, the probability of detecting a correct second bit is improved. If the second bit of QPCH is a "one" or an erasure, the mobile station is directed to process an associated paging channel at step 805.

Figure 9:
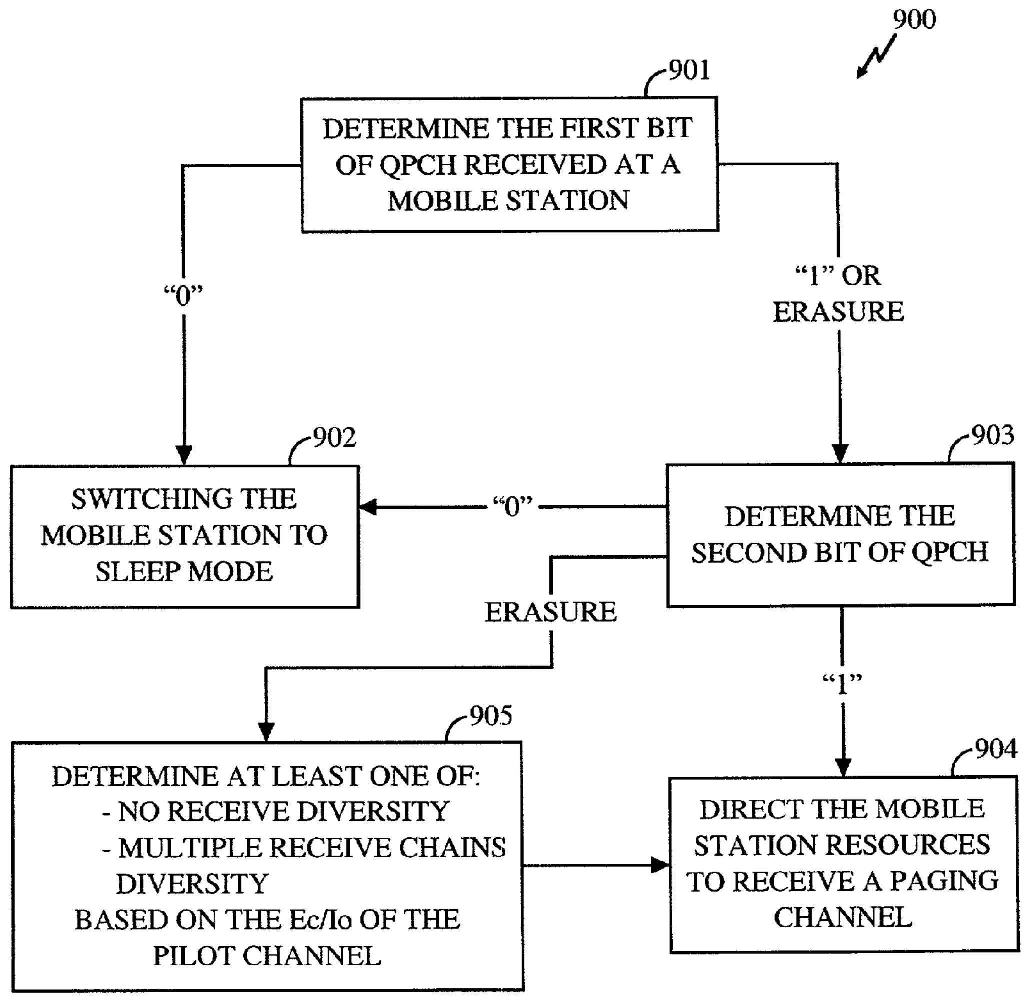
FIG. 9 illustrates a flow chart for determining data bits of QPCH and the steps for determining receive diversity based on a pilot channel condition in accordance with various embodiments of the invention.

Various steps for processings the QPCH and other channels are, further, improved by implementing various steps of flow chart 900 depicted in FIG. 9. At step 901, the first bit of the QPCH received at the mobile station is determined. If a "zero" is detected, the mobile station is switched to a sleep mode at step 902. If a "one" or an erasure is detected, at step 903, the second bit of QPCH received at the mobile station is determined. If the second bit is a "1", at step 904, the mobile station is directed to receive other channels such as the paging channel. If an erasure is detected, at step 905, the mobile station determines whether receive diversity is necessary based on a determined pilot channel Ec/Io. The controller 210 or processor 401 or both may be used to decide whether to use no diversity or multiple receiver chains receive diversity. Various steps described in relation to flow chart 500 and illustrated for diagram 600 may be used for implementing step 905. After determining the level of diversity at step 905, the mobile station is directed to receive other channels such as the paging channel. The process of receiving other channels at step 904 may include use of receive diversity. Therefore, depending on the channel condition, the probability of correctly receiving other channels is improved. One ordinary skilled in the art may appreciate that receive diversity may be necessary when an erasure is detected. An erasure may be determined when the received signal energy is not high enough to determine with confidence whether a "one" or a "zero" was transmitted. The scale of diversity may be determined based on the pilot channel Ec/10 as determined at step 905.

Figure 10:
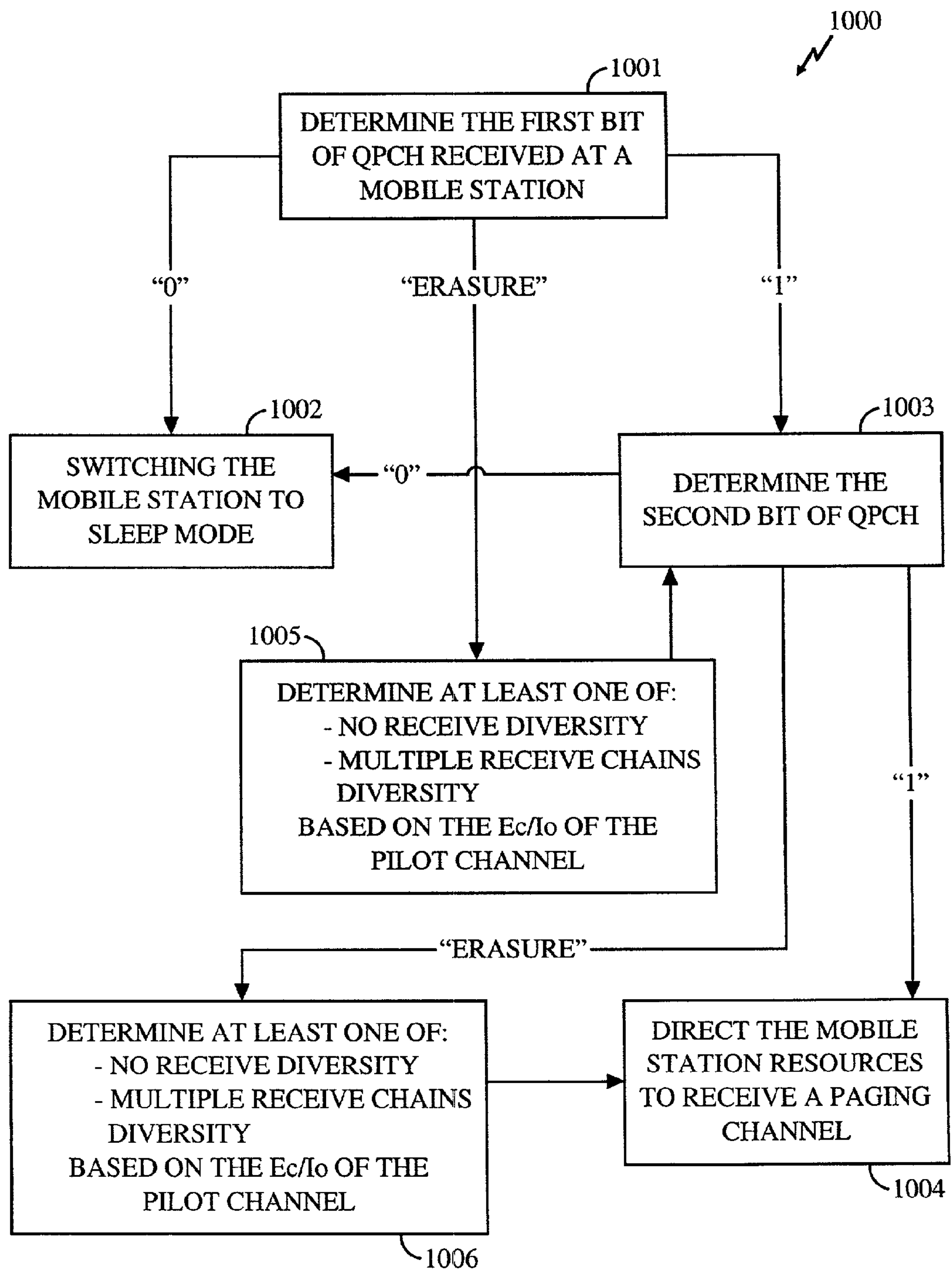
FIG. 10 illustrates a flow chart for determining data bits of QPCH and the steps for determining receive diversity based on a pilot channel condition in accordance with various embodiments of the invention.

Various steps for processing the QPCH and other channels are, further, improved by implementing various steps of flow chart 1000 depicted in FIG. 10. At step 1001, the first bit of the QPCH received at the mobile station is determined. If a "zero" is detected, the mobile station is switched to a sleep mode at step 1002. If the first bit is detected as a "one", at step 1003, the second bit of QPCH received at the mobile station is determined. If the first bit is detected as an erasure, at step 1005, the mobile station determines whether receive diversity is necessary based on a determined pilot channel Ec/Io. At this point, the process moves to step 1003 to determine the second received bit of the QPCH. If the second bit is detected as a "zero", the process moves to step 1002 to switch the mobile station to a sleep mode. If the second bit is a "one", at step 1004, the mobile station is directed to receive other channels such as the paging channel. If the second bit is detected as an erasure, at step 1006, the mobile station determines whether receive diversity is necessary based on a determined pilot channel Ec/Io. The process flow moves to step 1004 to direct the mobile station resources to receive a paging channel. The controller 210 or processor 401 or both may be used to decide whether to use no diversity or multiple receiver chains receive diversity. Various steps described in relation to flow chart 500 and illustrated for diagram 600 may be used for implementing steps 1005 and 1006. The process of determining the second bit at step 1003 and receiving other channels at step 1004 may include use of receive diversity. Therefore, depending on the channel condition, the probability of correctly processing the received second bit and other channels are improved. One ordinary skilled in the art may appreciate that receive diversity may be necessary when an erasure is detected. The processes as illustrated in relation to FIGS. 8, 9 and 10 may be include one or more additional steps for determining whether diversity is necessary, based on the pilot channel Ec/Io, before processing the first bit of the QPCH. Such steps are shown in FIG. 7 at steps 701 and 702.

Generally, minimum amount of battery power may be desirable to use for processing QPCH. Use of receive diversity increases the battery power consumption. Therefore, the decision to make use of receive diversity is critical in minimizing the amount of battery power used for processing QPCH. Various aspects of the invention as described are suitable for accomplishing minimum consumption of battery power while improving the reliability of the determining the QPCH data bits and decoding other channels. Improving reliability of the bit detection also improves battery life.

The determination to use diversity and to what scale may also be based on other factors such as frame error rate. Moreover, the parameter Ec/Io is an indication of the carrier strength over interference. Other similarly indicating parameters may also be used for determining the level of diversity. For example, the factor "Ec" may be used instead of Ec/Io without deviating from the spirit of invention. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for use in a communication system, the apparatus comprising:

a receiver, including a plurality of receiver chains adapted for processing in the receiver, for receiving a pilot channel and determining a channel condition of said pilot channel; and a control system for controlling receive diversity and power consumption of said receiver by selecting a number of said plurality of receiver chains based on said determined channel condition;

wherein:

said control system is configured for reducing said number of selected receiver chains when said determined channel condition is above a first channel condition threshold, said control system is configured for increasing said number of selected receiver chains when said determined channel condition is below a second channel condition threshold, said first channel condition threshold corresponds to a stronger channel condition than a channel condition corresponding to said second channel condition threshold, and said control system is configured for adjusting a delta threshold corresponding to a difference between said first and second channel condition thresholds based on a mobility level of said receiver in said communication system.

2. The apparatus as recited in claim 1 wherein said control system is configured for increasing said delta threshold in response to an increase in the mobility level and reducing said delta threshold in response to a decrease in the mobility level.

3. A method for determining receive diversity in a receiver of a communication system, the method comprising steps of:

receiving a pilot channel at the receiver, using a plurality of receiver chains in the receiver, said receiver chains being adapted for processing in the receiver;

determining a channel condition of said pilot channel;

selecting a number of said plurality of receiver chains used for processing in the receiver based on said determined channel condition for controlling receive diversity and power consumption of said receiver;

reducing said number of selected receiver chains when said determined channel condition is above a first channel condition threshold;

increasing said number of selected receiver chains when said determined channel condition is below a second channel condition threshold, wherein said first channel condition threshold corresponds to a stronger channel condition than a channel condition corresponding to said second channel condition threshold; and adjusting a delta threshold corresponding to a difference between said first and second channel condition thresholds based on a mobility level of said receiver in said communication system.

4. The method as recited in claim 3 wherein the step of adjusting comprises:

increasing said delta threshold in response to an increase in the mobility level.

5. The method as recited in claim 3 wherein the step of adjusting comprises:

reducing said delta threshold in response to a decrease in the mobility level.

6. A method in a communication system for decoding a quick paging channel (QPCH) comprising:

determining a channel condition of a pilot channel received at a mobile station in said communication system;

determining receive diversity at a receiver of said mobile station by determining a number of a plurality of receiver chains of said receiver for receive diversity based on said determined channel condition, wherein the number is reduced in response to the channel condition being above a first threshold, the number is increased in response to the channel condition being below a second threshold, and a difference between the first threshold and the second threshold is adjusted in response to mobility of the mobile station; and determining a first data bit of said QPCH received at said mobile station in accordance with processing of one or more signals produced based on said determined receive diversity, wherein power consumption of said receiver is controlled based on said receive diversity.

7. The method as recited in claim 6 further comprising:

switching said mobile station to a sleep mode when said determined first data bit is a zero.

8. The method as recited in claim 6 further comprising:

determining a second data bit of said QPCH received at said mobile station when said determined first data bit is either a one or an erasure.

9. The method as recited in claim 8 further comprising:

directing resources of said mobile station to decode a received channel when said determined second data bit is either a one or an erasure.

10. The method as recited in claim 8 further comprising:

switching said mobile station to a sleep mode when said determined second data bit is a zero.

11. An apparatus for decoding a quick paging channel (QPCH) in a communication system comprising:

a receiver for determining a channel condition of a pilot channel received at a mobile station in said communication system;

a controller for determining receive diversity at said receiver by determining a number of a plurality of receiver chains of said receiver for receive diversity based on said determined channel condition, wherein the number is reduced in response to the channel condition being above a first threshold, the number is increased in response to the channel condition being below a second threshold, and a difference between the first threshold and the second threshold is adjusted in response to mobility of the mobile station, and wherein a first data bit of said QPCH received at said receiver is determined in accordance with processing of one or more signals produced based on said determined receive diversity, wherein power consumption of said receiver is controlled based on said receive diversity.

12. The apparatus as recited in claim 11 wherein said controller is configured to switch said mobile station to a sleep mode when said determined first data bit is a zero.

13. The apparatus as recited in claim 11 wherein, when said determined first data bit is either a one or an erasure, a second data bit of said QPCH received at said mobile station is determined, and said controller is configured for directing resources of said mobile station to decode a received channel when said determined second data bit is either a one or an erasure and switching said mobile station to a sleep mode when said determined second data bit is a zero.

14. A method for decoding a quick paging channel (QPCH) in a communication system comprising:

determining a first data bit of said QPCH received at a receiver, including a plurality of receiver chains for receive diversity, in a mobile station in said communication system;

determining receive diversity at said receiver of said mobile station in response to said determined first data bit being a one or an erasure, wherein said determining said receive diversity includes determining a number of said plurality of receiver chains for receive diversity based on a channel condition of a pilot channel received at said receiver, wherein power consumption of said receiver is controlled based on said receive diversity.

15. The method as recited in claim 14 further comprising: switching said mobile station to a sleep mode in response to said determined first data bit being a zero.

16. The method as recited in claim 14 further comprising: determining a second bit of said QPCH received at said receiver in accordance with a receive processing of said determined receive diversity;

directing said mobile station resources to receive a receive channel when said determined second bit is either a one or an erasure.

17. The method as recited in claim 14 further comprising: determining a second bit of said QPCH received at said receiver in accordance with a processing of said determined receive diversity; and switching said mobile station to a sleep mode in response to said determined second data bit being a zero.

18. An apparatus for decoding a quick paging channel (QPCH) in a mobile station in a communication system comprising:

a receiver for determining a first data bit of said QPCH, wherein said receiver includes a plurality of receiver chains for receive diversity; and a control system for selecting, in response to the first data bit being a one or an erasure, a number of said plurality of receiver chains for receive diversity based on a channel condition of a pilot channel received at said receiver, wherein power consumption of said receiver is controlled based on said receive diversity.

19. The apparatus as recited in claim 18 wherein said control system switches said mobile station to a sleep mode in response to said determined first data bit being a zero.

20. The apparatus as recited in claim 18 wherein said receiver determines a second bit of said QPCH in accordance with a receive processing of said determined receive diversity, and said control system directs said mobile station resources to receive a receive channel when said determined second bit is either a one or an erasure.

21. The apparatus as recited in claim 18 wherein said receiver determines a second bit of said QPCH in accordance with a processing of said determined receive diversity, and said control system switches said mobile station to a sleep mode in response to said determined second data bit being a zero.

22. A method for decoding a quick paging channel (QPCH) in a communication system comprising:

determining a first data bit of said QPCH received at a receiver, the receiver including a plurality of receiver chains for receive diversity, in a mobile station in said communication system;

switching said mobile station to a sleep mode in response to said determined first data bit being a zero;

determining a second bit of said QPCH received at said receiver in response to said first data bit of said QPCH being either a one or an erasure;

determining receive diversity at said receiver of said mobile station in response to said determined second data bit being an erasure based on a channel condition of pilot channel received at said receiver;

directing said mobile station resources to receive a receive channel in response to said determined second data bit being a one, in accordance with a receive processing of said determined receive diversity;

wherein power consumption of said receiver depends on said receive diversity.

23. An apparatus for decoding a quick paging channel (QPCH) in a mobile station of a communication system, the apparatus comprising:

a receiver for determining a first data bit of said QPCH received at said receiver, wherein said receiver includes a plurality of receiver chains for receive diversity, and for determining a second data bit of said QPCH received at said receiver when said first data bit of said QPCH is either a one or an erasure;

a control system for switching said mobile station to a sleep mode in response to said determined first data bit being a zero, for determining receive diversity at said receiver in response to said determined second data bit being an erasure based on a channel condition of pilot channel received at said receiver, and for directing resources of said mobile station to receive a receive channel in accordance with a receive processing of said determined receive diversity when said determined second data bit is a one, wherein power consumption of said receiver is controlled based on said receive diversity.

24. A method for decoding a quick paging channel (QPCH) in a communication system comprising:

determining a first data bit of said QPCH received at a receiver, the receiver including a plurality of receiver chains for receive diversity, in a mobile station in said communication system;

switching said mobile station to a sleep mode in response to said determined first data bit being a zero;

determining a second bit of said QPCH received at said receiver in response to said first data bit of said QPCH being a one;

determining first receive diversity at said receiver of said mobile station in response to said determined first data bit being an erasure based on a channel condition of pilot channel received at said receiver, wherein the step of determining the second bit is performed in accordance with said determined first receive diversity, wherein power consumption of said receiver is controlled based on receive diversity.

25. The method as recited in claim 24 further comprising: directing said mobile station resources to receive a receive channel when said determined second data bit is a one.

26. The method as recited in claim 24 further comprising: determining second receive diversity at said receiver of said mobile station in response to said determined second data bit being an erasure based on a channel condition of the pilot channel received at said receiver and directing resources of said mobile station to receive a receive channel, after said determining second receive diversity at said receiver, in accordance with a receive processing of said determined second receive diversity.

27. An apparatus for decoding a quick paging channel (QPCH) in a communication system comprising:

a receiver for determining a first data bit of said QPCH received at said receiver, the receiver including a plurality of receiver chains for receive diversity, in a mobile station in said communication system and determining a second bit of said QPCH received at said receiver when said first data bit of said QPCH is a one;

a control system for switching said mobile station to a sleep mode in response to said determined first data bit being a zero and for determining first receive diversity at said receiver of said mobile station in response to said determined first data bit being an erasure based on a channel condition of pilot channel received at said receiver, and wherein said receiver determines said second bit of said QPCH received at said receiver in accordance with said determined first receive diversity, wherein power consumption of said receiver is controlled based on receive diversity.

28. The apparatus as recited in claim 27 wherein said control system directs said mobile station resources to receive a receive channel when said determined second data bit is a one.

29. The apparatus as recited in claim 27 wherein said control system determines second receive diversity at said receiver of said mobile station in response to said determined second data bit being an erasure based on a channel condition of the pilot channel received at said receiver and directing resources of said mobile station to receive a receive channel, after said determining second receive diversity at said receiver, in accordance with a receive processing of said determined second receive diversity.

30. An apparatus for use in a communication system, the apparatus comprising:

means for receiving a pilot channel and determining a channel condition of said pilot channel to obtain a determined channel condition;

means for controlling receive diversity and power consumption of a mobile device based on said determined channel condition, wherein the means for controlling is configured to reduce a number of receiver chains in response to said determined channel condition being above a first channel condition threshold, increase the number of receiver chains in response to said determined channel condition being below a second channel condition threshold, and adjust a difference between said first channel condition threshold and said second channel condition threshold based on a mobility level of said mobile device.

31. A non-transitory computer-readable storage medium storing instructions for determining receive diversity in a receiver of a communication system, the instructions comprising code for:

receiving a pilot channel at the receiver, using a plurality of receiver chains in the receiver, said receiver chains being adapted for processing in the receiver;

determining a channel condition of said pilot channel to obtain a determined channel condition;

selecting a number of said plurality of receiver chains used for processing in the receiver based on said determined channel condition for controlling receive diversity and power consumption of said receiver;

reducing said number of selected receiver chains when said determined channel condition is above a first channel condition threshold;

increasing said number of selected receiver chains when said determined channel condition is below a second channel condition threshold, wherein said first channel condition threshold corresponds to a stronger channel condition than a channel condition corresponding to said second channel condition threshold; and adjusting a delta threshold corresponding to a difference between said first and second channel condition thresholds based on a mobility level of said receiver in said communication system.

32. The non-transitory computer-readable storage medium as recited in claim 31, the instructions further comprising code for:

increasing said delta threshold in response to an increase in the mobility level.

33. The non-transitory computer-readable storage medium as recited in claim 31, the instructions further comprising code for:

reducing said delta threshold in response to a decrease in the mobility level.

34. A processor for determining receive diversity in a receiver of a communication system, the processor comprising:

means for receiving a pilot channel and determining a channel condition of said pilot channel to obtain a determined channel condition;

means for controlling receive diversity and power consumption of said receiver based on said determined channel condition, wherein the means for controlling is configured to reduce a number of receiver chains when said determined channel condition is above a first channel condition threshold, increase the number of receiver chains when said determined channel condition is below a second channel condition threshold, and adjust a difference between said first channel condition threshold and said second channel condition threshold based on a mobility level of said receiver.

* * * * *